(12) United States Patent
Varchavtchik et al.

(10) Patent No.: US 8,943,258 B2
(45) Date of Patent: Jan. 27, 2015

(54) SERVER DIRECT ATTACHED STORAGE SHARED THROUGH VIRTUAL SAS EXPANDERS

(75) Inventors: Luiz D. Varchavtchik, Wichita, KS (US); Jason A. Unrein, Wichita, KS (US); Reid A. Kaufmann, Andover, KS (US)

(73) Assignee: LSI Corporation, San Jose, CA (US)

( * ) Notice: Subject to any disclaimer, the term of this patent is extended or adjusted under 35 U.S.C. 154(b) by 441 days.

(21) Appl. No.: 13/289,617

(22) Filed: Nov. 4, 2011

(65) Prior Publication Data

US 2013/0117485 A1 May 9, 2013

(51) Int. Cl.
G06F 13/00 (2006.01)
G06F 13/14 (2006.01)
G06F 3/06 (2006.01)

(52) U.S. Cl.
CPC .............. *G06F 3/0658* (2013.01); *G06F 13/14* (2013.01); *G06F 13/00* (2013.01); *G06F 3/0626* (2013.01); *G06F 3/067* (2013.01)
USPC ............ 710/316; 710/300; 710/305; 709/216

(58) Field of Classification Search
USPC ............. 710/72, 74, 300, 305, 306, 311–315, 710/316; 709/211–212, 216–217, 219; 714/100, 1–4.1, 4.2
See application file for complete search history.

(56) References Cited

U.S. PATENT DOCUMENTS

| | | | |
|---|---|---|---|
| 7,739,432 B1 * | 6/2010 | Shaw et al. ..................... 710/74 |
| 7,958,293 B2 | 6/2011 | Bakke et al. | |
| 8,171,176 B2 | 5/2012 | Battacharya et al. | |
| 2002/0095470 A1 * | 7/2002 | Cochran et al. ............... 709/208 |
| 2005/0289386 A1 * | 12/2005 | Tawil et al. ....................... 714/6 |
| 2007/0070885 A1 * | 3/2007 | Uddenberg et al. ........... 370/225 |
| 2009/0094620 A1 * | 4/2009 | Kalwitz et al. ................ 719/325 |
| 2009/0119449 A1 * | 5/2009 | Nagaram Chengal ........ 711/103 |
| 2010/0191894 A1 * | 7/2010 | Bartley et al. ....................... 711/5 |
| 2012/0137065 A1 * | 5/2012 | Odenwald et al. ............. 711/114 |
| 2012/0137166 A1 * | 5/2012 | Kurihara et al. ............... 714/5.1 |
| 2012/0159029 A1 * | 6/2012 | Krishnan et al. .............. 710/301 |
| 2012/0191886 A1 * | 7/2012 | Ballard et al. ................. 710/106 |
| 2012/0284435 A1 * | 11/2012 | Myrah et al. ..................... 710/74 |
| 2012/0317324 A1 * | 12/2012 | Aggarwal et al. ............. 710/300 |
| 2013/0007410 A1 * | 1/2013 | Kopylovitz et al. .......... 711/209 |
| 2013/0058034 A1 * | 3/2013 | Wada et al. ............... 361/679.34 |
| 2013/0111125 A1 * | 5/2013 | Black et al. ................... 711/113 |
| 2013/0117337 A1 * | 5/2013 | Dunham ....................... 707/827 |
| 2013/0219101 A1 * | 8/2013 | Hansen et al. ................. 710/313 |
| 2014/0025850 A1 * | 1/2014 | Varchavtchik et al. ......... 710/74 |

FOREIGN PATENT DOCUMENTS

WO WO 2010103670 A1 * 9/2010

OTHER PUBLICATIONS

"Shared Internal Storage: An Introduction". 2007. Seanodes SA.*
"Mini Serial Attached SCSI (miniSAS) Internal Cable Assemblies". 2007. 32 Company.*
"Transistioning to 6Gb/s SAS (Serial Attached SCSI)". Dec. 2009. Dell Inc.*
"Configuring SATA and SAS in HP Proliant SL6000 servers". Nov. 2009. Hewlett-Packard Development Company, L.P.*
Bright, Peter. "The Ars Technica Guide to I/O Virtualization". Feb. 11, 2010. Retrieved from Internet Sep. 9, 2014. <http://arstechnica.com/business/2010/02/io-virtualization>.*

* cited by examiner

*Primary Examiner* — Thomas J Cleary
(74) *Attorney, Agent, or Firm* — Suiter Swantz pc llo

(57) ABSTRACT

A data storage system includes a first server including: a first plurality of storage disks configured to store data, and a first host bus adapter including a first processor configured to provide a first virtual expander and a first logic component; and a second server including: a second plurality of storage disks configured to store data, and a second host bus adapter including a second processor configured to provide a second virtual expander and a second logic component, wherein the first host bus adapter of the first server is coupled to the second host bus adapter of the second server via a SAS connection, and wherein each of the first plurality of storage disks and the second plurality of storage disks are accessible by each of the first server and the second server.

20 Claims, 4 Drawing Sheets

SERVER DIRECT ATTACHED STORAGE SHARED THROUGH VIRTUAL SAS EXPANDERS

FIELD

The present disclosure generally relates to the field of data storage systems, and more particularly to server direct attached storage shared through virtual SAS (serial attached SCSI (small computer system interface)) expanders.

BACKGROUND

Cloud computing is on the rise by providing a model for enabling on-demand network access to a shared pool of configurable computing resources (e.g., networks, servers, storage, applications, and services) that can be rapidly provisioned and released with minimal management effort or service provider interaction. Cloud computing generally utilizes clustering for redundancy, which may be accomplished through a variety of storage configurations, four of which are provided herein, each of which includes problematic features: (1) Each node may be connected to a common SAN (storage area network) fabric, which may provide a low latency block interface to storage; (2) each node may be connected to an Ethernet network, which may utilize file access to shared storage; (3) external JBODs ("just a bunch of disks"); and (4) direct attached drives (internal).

Configurations (1) and (2) may require an additional external element, such as a Fiber or Ethernet switch, to connect nodes to common storage for forming a cluster. Such an external element may be undesirable, as the element provides a single point of failure. As a result, a redundancy component may be required to provide high availability of the configurations, which would incorporate additional cost to the systems.

Configuration (3) may be generally cost effective, however, the configuration limits the amount of nodes in a cluster to the number of connectors on the JBOD, which may be prohibitively constrictive and limit scalability. Moreover, configurations (1)-(3) generally require the storage system to be located in an external enclosure, which imposes additional power, space, and maintenance costs.

Configuration (4), while being generally economical, makes no provision for high availability clustering, since no shared storage exists for the attached drives. As such, these configurations present problematic costs and complexity and do not present desirable solutions to storage requirements (e.g., redundancy and common access) for high availability clustering.

SUMMARY

In one implementation of the present disclosure, a data storage system includes a first server including: a first plurality of storage disks configured to store data, and a first host bus adapter including a first processor configured to provide a first virtual expander and a first logic component; and a second server including: a second plurality of storage disks configured to store data, and a second host bus adapter including a second processor configured to provide a second virtual expander and a second logic component, wherein the first host bus adapter of the first server is coupled to the second host bus adapter of the second server via a SAS connection, and wherein each of the first plurality of storage disks and the second plurality of storage disks are accessible by each of the first server and the second server.

In another implementation of the present disclosure, a data storage system includes a first server comprising: a first plurality of storage disks configured to store data, and a first host bus adapter including a first multi-core processor, wherein one core of the first multi-core processor is configured to provide a first virtual expander; and a second server comprising: a second plurality of storage disks configured to store data, and a second host bus adapter including a second multi-core processor, wherein one core of the second multi-core processor is configured to provide a second virtual expander, wherein the first host bus adapter of the first server is coupled to the second host bus adapter of the second server via a SAS connection, and wherein each of the first plurality of storage disks and the second plurality of storage disks are accessible by each of the first server and the second server.

In a further implementation of the present disclosure, a data storage system includes at least four servers, each of the at least four servers including: a plurality of storage disks configured to store data, a first host bus adapter including a first processor configured to provide a first virtual expander; and a second host bus adapter including a second processor configured to provide a second virtual expander, wherein each of the at least four servers includes a first connection configuration which connects the first virtual expander of one of the at least four servers to a different first virtual expander of two other servers of the at least four servers, each of the at least four servers includes a second connection configuration which connects the second virtual expander of one of the at least four servers to a different second virtual expander of two other servers of the at least four servers, and wherein the first connection configuration of at least one server of the at least four servers differs from the second connection configuration of the at least one server of the at least four servers according to which servers are associated with the first connection configuration and the second connection configuration.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

The present disclosure provides implementations for servers to belong to a cluster of nodes (e.g., servers), sharing storage in common, without use of an external element that is a switch or external storage. Generally, SAS technology is utilized with direct attached disks in each node, with connections between each node, thereby emulating a SAN environment through a cascaded SAS topology. Modern computing servers may include disks embedded through SAS, where internal storage of one server may be shared amongst other connected servers. Where internal storage is shared, external storage may not be necessary for significant data access. SAS HBAs (host bus adapters) that are capable of emulating an expander may be utilized to enable bi-directional traffic to all other nodes and the corresponding attached disks.

Figure 1:
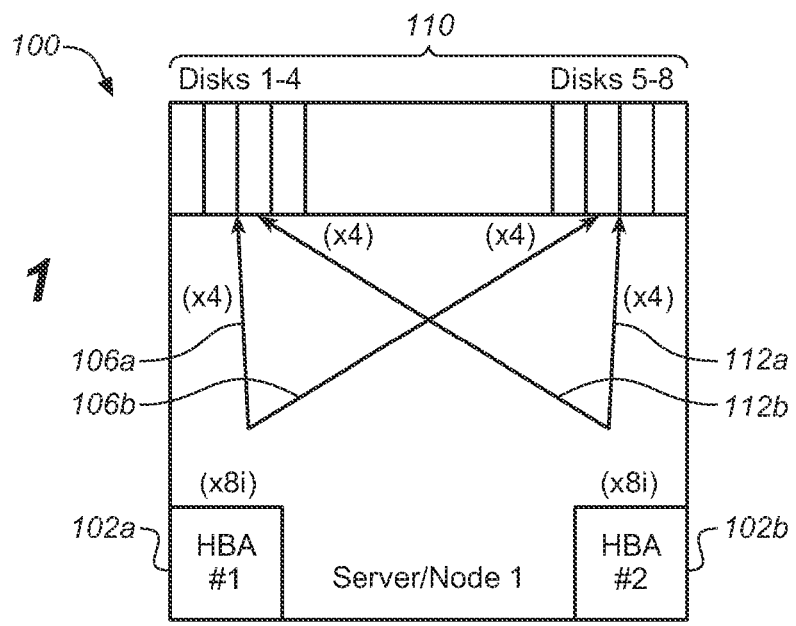
FIG. 1 is a schematic illustration of an internal layout of a server.
Figure 2:
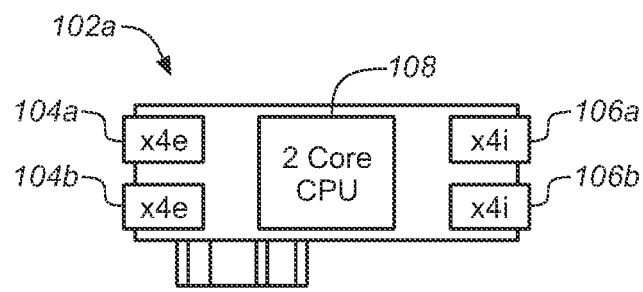
FIG. 2 is a schematic illustration of a host bus adapter.

FIG. 1 depicts a schematic illustration of a server 100 that may be incorporated into a cluster of nodes. The server 100 may include one or more HBAs (e.g., SAS HBAs), where FIG. 1 depicts two HBAs, 102a and 102b. FIG. 2 depicts a schematic illustration of the components of HBA 102a. As depicted, HBA 102a includes a pair of four external connectors, 104a and 104b, and a pair of four internal connectors, 106a and 106b for a total of 16 phys. HBA 102 also includes a processor, such as a 2-core CPU 108, for managing operation of HBA 102a. As shown in FIG. 1, the pair of four internal connectors, 106a and 106b, connect HBA 102a to a plurality of disks 110 available as storage on server 100. Similarly, HBA 102b includes connectors 112a and 112b which connect HBA 102b to the plurality of disks 110 on server 100.

Figure 3A:
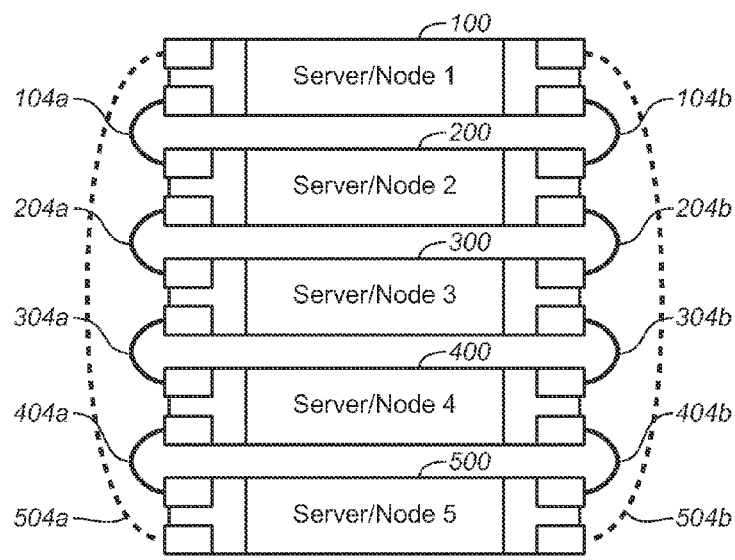
FIG. 3A is a schematic illustration of a configuration for a cascaded DAS (direct-attached storage) cluster.

The external connectors (e.g., 104a and 104b) of HBA 102a and HBA 102b serve to connect the server 100 to other servers that are part of the cluster. Each server includes at least one HBA to connect to other servers in the cluster, where more than one HBA per server permits redundancy. For instance, each server/node may include SAS connections to two other nodes (via the HBAs of each server/node) for redundancy. As shown in FIG. 3A, a schematic illustration of a configuration for a cascaded DAS cluster is provided. The configuration includes five servers/nodes, 100, 200, 300, 400, and 500, where server/node 100 may be characterized as the first node, and where server/node 500 may be characterized as the last node. Server/node 100 is linked to server/node 200 via connectors 104a and 104b. Server/node 200 is linked to server/node 300 via connectors 204a and 204b. Server/node 300 is linked to server/node 400 via connectors 304a and 304b. Server/node 400 is linked to server/node 500 via connectors 404a and 404b. The first node and the last node may also be connected to each other, however the connection may be disabled, such as to prevent a loop (e.g., an invalid SAS topology). As shown in FIG. 3A, server/node 100 is connected to server/node 500 via connectors 504a and 504b, which are in a disabled state until a node in the cluster becomes unavailable. In the event that a node or a connection is no longer operational (e.g., a node failure), the disabled connection (e.g., connectors 504a and 504b) between the first node and the last node may immediately be enabled by firmware to ensure uninterrupted access to all available nodes. Each server/node of the system may contain local SAS (or SATA (serial AT attachment)) storage that is accessible to all nodes, such as the plurality of disks 110. As provided herein, each node may include redundant connections to two other nodes, i.e., dual paths to all end devices may be utilized for redundancy, however, redundant connections may not be required in all implementations of the present disclosure.

Figure 3B:
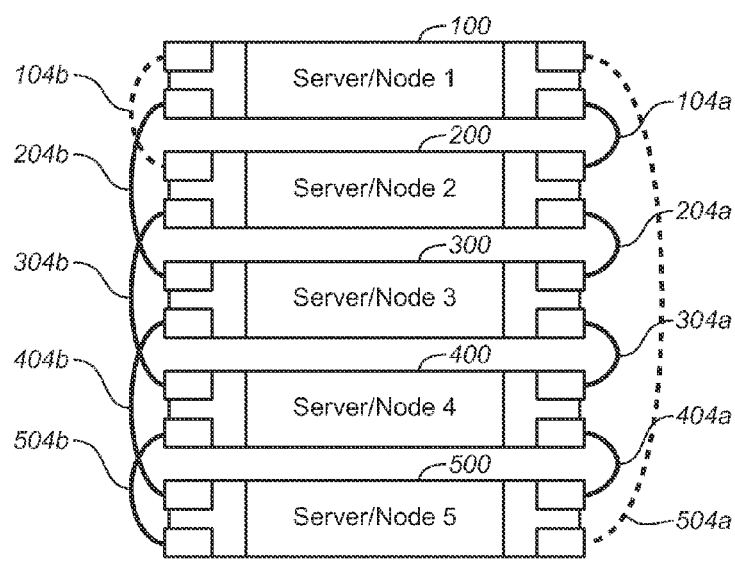
FIG. 3B is another configuration of a cascaded DAS cluster.

Referring to FIG. 3B, another configuration of a cascaded DAS cluster is shown, wherein the cluster includes two differing cabling patterns. For instance, the configuration of connectors 104a, 204a, 304a, 404a, and 504a is the same configuration as described with reference to FIG. 3A, whereas the configuration of connectors 104b, 204b, 304b, 404b, and 504b in FIG. 3B is different than that of the configuration of connectors 104b, 204b, 304b, 404b, and 504b in FIG. 3A. By including differing cabling patterns in the configuration shown in FIG. 3B, the cabling patterns may reduce latency and increase system/drive availability than if each HBA of a server/node is connected to the same server/node. Connectors 104b and 504a of FIG. 3B may be failover connections that are disabled when each server/node of the cluster is operational, but are activated when a node or connection in the cluster is no longer operational (e.g., a node failure). Firmware may immediately activate connector 104b and/or 504a when the node or connection in the cluster is no longer operational, in order to provide uninterrupted access to all available nodes in the cluster.

Figure 4:
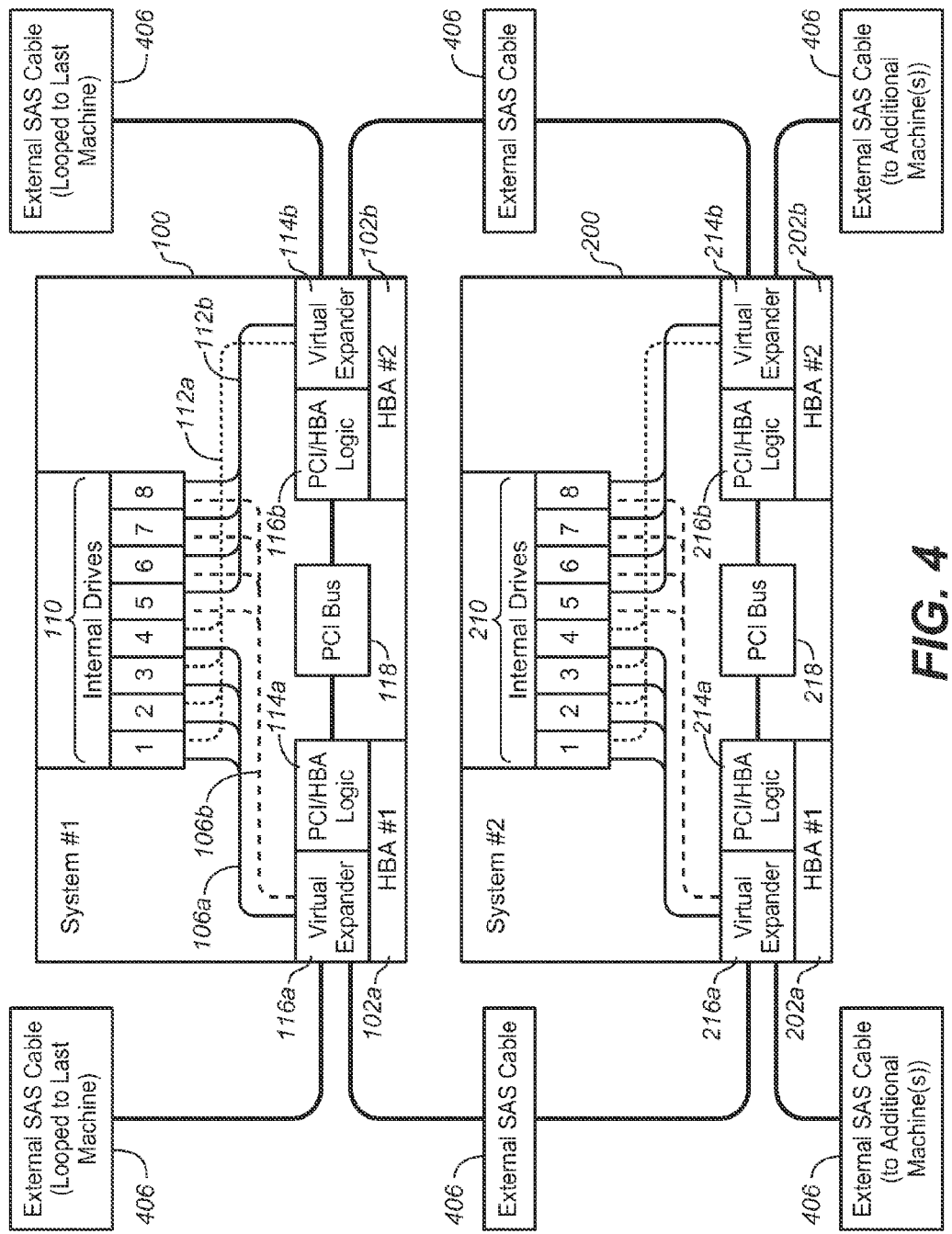
FIG. 4 is a schematic illustration of a portion of the cascaded DAS cluster of FIG. 3A.

Referring to FIG. 4, a schematic illustration of a portion of the cascaded DAS cluster of FIG. 3A is shown. As shown in FIG. 4, each HBA of each server/node may include two main components: (1) PCI (peripheral component interconnect) logic and HBA logic to provide operation of the HBA and communication between multiple HBAs on system 100, and (2) a virtual expander to handle the routing of traffic between drives and the HBA logic component and between the HBA logic component and external phys. For instance, HBA 102a of server/node 100 includes a PCI/HBA logic component 114a and a virtual expander 116a, whereas HBA 102b of server/node 100 includes a PCI/HBA logic component 114b and a virtual expander 116b. Connectors 106a and 106b may couple the plurality of drives 110 to the virtual expander 116a of HBA 102a, and connectors 112a and 112b may couple the plurality of drives 110 to the virtual expander 116b of HBA 102b. Similar configurations may be present for the other servers/nodes that are part of the cluster, e.g., HBA 202a of server/node 200 includes a PCI/HBA logic component 214a and a virtual expander 216a, whereas HBA 202b of server/node 200 includes a PCI/HBA logic component 214b and a virtual expander 216b, with connections being made between the plurality of drives 210 and the virtual expanders 216a and 216b.

Each server/node may also include a bus to provide for communication between components of the server/node. For instance, server/node 100 may include a PCI bus 118, which may be coupled to each of HBA 102a and HBA 102b, whereas server/node 200 may include a PCI bus 218 coupled to each of HBA 202a and HBA 202b. Further, each server/node may be connected to two other server/nodes, such as described with reference to FIGS. 3A and 3B. The connections between each server/node may include a SAS connector, such as SAS cables 406, which provide an external coupling between each server/node. As shown in FIG. 4, server/node 100 includes two external SAS cables 406 which are looped to couple with the last machine in the cluster (e.g., the end node). As described herein, one or more of the SAS cables may be disabled to prevent invalid SAS topologies by functioning as failover cables.

Figure 5:
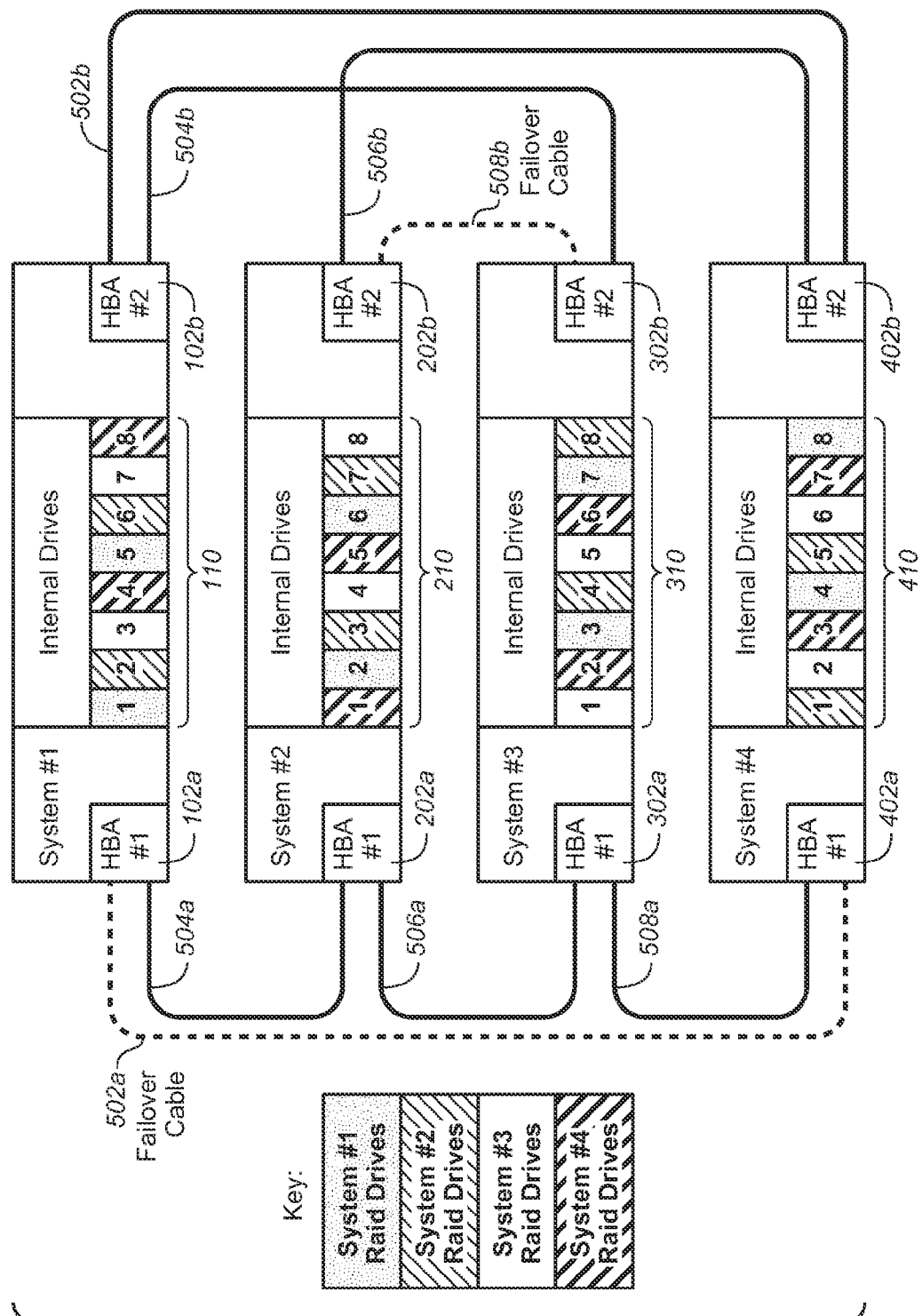
FIG. 5 is a schematic illustration of one implementation of a cascaded DAS cluster.

Referring now to FIG. 5, a schematic illustration of one implementation of a cascaded DAS cluster is shown. In general, the implementation of the cascaded DAS cluster in FIG. 5 differs from that shown in FIG. 4 based on the connections between servers/nodes. The implementation of FIG. 5 displays external phys on one side of the server/node system having a differing coupling pattern than the corresponding external phys on the other side of the server node. For instance as shown, HBA 102a of server/node 100 is coupled to HBA 402a of server/node 400 via connector 502a and to HBA 202a of server/node 200 via connector 504a, whereas HBA 102b is coupled to HBA 402b of server/node 400 via connector 502b and to HBA 302b of server/node 300 via connector 504b; HBA 202a of server/node 200 is coupled to HBA 102a of server/node 100 via connector 504a and to HBA 302a of server/node 300 via connector 506a, whereas HBA 202b of server/node 200 is coupled to HBA 402b of server/node 400 via connector 506b and to HBA 302b of server/node 300 via connector 508b; and HBA 302a is coupled to HBA 202a of server/node 200 via connector 506a and to HBA 402a of server/node 400 via connector 508a, whereas HBA 302b is coupled to HBA 202b of server/node 200 via connector 508b and to HBA 102b of server/node 100 via connector 504b. Such a coupling pattern may reduce latency and increase system/drive availability than if each HBA of a server/node is connected to the same server/node.

Connectors 502a and 508b may be failover connections that are disabled when each server/node of the cluster is operational, but are activated when a node or connection in the cluster is no longer operational (e.g., a node failure). Firmware may immediately activate connector 502a and/or 508b when the node or connection in the cluster is no longer operational, in order to provide uninterrupted access to all available nodes in the cluster.

In order to expedite data access/handling, incoming 10 (input/output) may be processed by an efficient routing algorithm which utilizes a multi-core processor on the HBA, such as the 2-core CPU 108 shown in FIG. 2. Such usage may reduce latency of the virtual expander (e.g., virtual expander 116a) of the HBA. For example, where the HBA include a 2-core processor, the second core may be dedicated to the virtual expander.

The cascaded DAS cluster implementation shown in FIG. 5 may also be configured for RAID (redundant array of independent disks) operability. For instance, the plurality of drives 110, 210, 310, 410 of the server/nodes of the cluster may be placed into RAID configurations (such as those shown in FIG. 5) to provide a cluster with increased availability, such as by mitigating one or more of drive failure, system failure, BHA failure, or cable failure.

It is believed that the present disclosure and many of its attendant is advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A data storage system, comprising:
 a first server comprising:
  a first plurality of storage drives configured to store data; and
  a first host bus adapter including a first processor and first external phys, the first processor being configured to provide a first virtual expander and a first logic component, the first processor including a first core and a second core, the first core of the first processor being dedicated to the first virtual expander, the second core of the first processor for handling the first logic component, wherein the first virtual expander is configured to handle routing of traffic between the first plurality of storage drives and the first logic component and between the first logic component and the first external phys; and
 a second server comprising:
  a second plurality of storage drives configured to store data; and
  a second host bus adapter including a second processor and second external phys, the second processor being configured to provide a second virtual expander and a second logic component, the second processor including a first core and a second core, the first core of the second processor being dedicated to the second virtual expander, the second core of the second processor for handling the second logic component, wherein the second virtual expander is configured to handle routing of traffic between the second plurality of storage drives and the second logic component and between the second logic component and the second external phys,
 wherein the first external phys of the first host bus adapter of the first server is coupled to the second external phys of the second host bus adapter of the second server via a serial attached small computer system interface (SAS) connection, and wherein each of the first plurality of storage drives and the second plurality of storage drives are accessible by each of the first server and the second server.

2. The system of claim 1, wherein the SAS connection is a SAS cable.

3. The system of claim 1, wherein the first virtual expander of the first host bus adapter of the first server is coupled to the second virtual expander of the second host bus adapter of the second server via the SAS connection.

4. The system of claim 1, wherein each of the first server and the second server further comprises a secondary host bus adapter.

5. The system of claim 4, wherein the secondary host bus adapter of the first server is coupled to the secondary host bus adapter of the second server.

6. The system of claim 4, further including a bus coupled to each of the first host bus adapter and the secondary host bus adapter of the first server.

7. The system of claim 1, further comprising a third server, the third server comprising:
 a third plurality of storage drives configured to store data; and
 a third host bus adapter including a third processor and third external phys, the third processor being configured to provide a third virtual expander and a third logic component, the third processor including a first core and a second core, the first core of the third processor being dedicated to the third virtual expander, the second core of the third processor for handling the third logic component, wherein the third virtual expander is configured to handle routing of traffic between the third plurality of storage drives and the third logic component and between the third logic component and third second external phys,
 wherein the first server is coupled to the third server, and the second server is coupled to the third server.

8. The system of claim 7, including a failover connection between one of the first server and the second server, the first server and the third server, or the second server and the third server.

9. The system of claim 1, wherein the first plurality of storage drives and the second plurality of storage drives are configured in a redundant array of independent disks (RAID) configuration.

10. A data storage system, comprising:
a first server comprising:
- a first plurality of storage drives configured to store data; and
- a first host bus adapter including a first multi-core processor and first external phys, the first multi-core processor being configured to provide a first virtual expander and a first logic component, the first multi-core processor including a first core and a second core, the first core of the first multi-core processor being dedicated to the first virtual expander, the second core of the first multi-core processor for handling the first logic component, wherein the first virtual expander is configured to handle routing of traffic between the first plurality of storage drives and the first logic component and between the first logic component and the first external phys; and a second server comprising:
- a second plurality of storage drives configured to store data; and
- a second host bus adapter including a second multi-core processor and second external phys, the second multi-core processor being configured to provide a second virtual expander and a second logic component, the second multi-core processor including a first core and a second core, the first core of the second multi-core processor being dedicated to the second virtual expander, the second core of the second multi-core processor for handling the second logic component, wherein the second virtual expander is configured to handle routing of traffic between the second plurality of storage drives and the second logic component and between the second logic component and the second external phys, wherein the first external phys of the first host bus adapter of the first server is coupled to the second external phys of the second host bus adapter of the second server via a serial attached small computer system interface (SAS) connection, and wherein each of the first plurality of storage drives and the second plurality of storage drives are accessible by each of the first server and the second server.

11. The system of claim 10, wherein the SAS connection is a SAS cable.

12. The system of claim 10, wherein the first virtual expander of the first host bus adapter of the first server is coupled to the second virtual expander of the second host bus adapter of the second server via the SAS connection.

13. The system of claim 10, wherein each of the first server and the second server further comprises a secondary host bus adapter.

14. The system of claim 13, wherein the secondary host bus adapter of the first server is coupled to the secondary host bus adapter of the second server.

15. The system of claim 13, further including a bus coupled to each of the first host bus adapter of the first server and the secondary host bus adapter of the first server.

16. The system of claim 10, further comprising a third server, the third server comprising:
- a third plurality of storage drives configured to store data; and
- a third host bus adapter including a third multi-core processor and third external phys, the third multi-core processor being configured to provide a third virtual expander and a third logic component, the third multi-core processor including a first core and a second core, the first core of the third multi-core processor being dedicated to the third virtual expander, the second core of the third multi-core processor for handling the third logic component, wherein the third virtual expander is configured to handle routing of traffic between the third plurality of storage drives and the third logic component and between the third logic component and the third external phys, wherein the first server is coupled to the third server, and the second server is coupled to the third server.

17. The system of claim 16, including a failover connection between one of the first server and the second server, the first server and the third server, or the second server and the third server.

18. The system of claim 10, wherein the first plurality of storage drives and the second plurality of storage drives are configured in a redundant array of independent disks (RAID) configuration.

19. A data storage system, comprising:
at least four servers, each of the at least four servers comprising:
- a plurality of storage drives configured to store data;
- a first host bus adapter including a first processor and first external phys, the first processor being configured to provide a first virtual expander and a first logic component, the first processor including a first core and a second core, the first core of the first processor being dedicated to the first virtual expander, the second core of the first processor for handling the first logic component, wherein the first virtual expander is configured to handle routing of traffic between the first plurality of storage drives and the first logic component and between the first logic component and the first external phys; and
- a second host bus adapter including a second processor and second external phys, the second processor being configured to provide a second virtual expander and a second logic component, the second processor including a first core and a second core, the first core of the second processor being dedicated to the second virtual expander, the second core of the second processor for handling the second logic component, wherein the second virtual expander is configured to handle routing of traffic between the second plurality of storage drives and the second logic component and between the second logic component and the second external phys, wherein each of the at least four servers includes a first connection configuration which connects the first virtual expander of one of the at least four servers to a different first virtual expander of two other servers of the at least four servers, each of the at least four servers includes a second connection configuration which connects the second virtual expander of one of the at least four servers to a different second virtual expander of two other servers of the at least four servers, and wherein the first connection configuration of at least one server of the at least four servers differs from the second connection configuration of the at least one server of the at least four servers according to which servers are associated with the first connection configuration and the second connection configuration.

20. The system of claim 19, wherein the plurality of storage drives of each of the at least four servers are configured in a redundant array of independent disks (RAID) configuration.

* * * * *